United States Patent Office
3,784,570
Patented Jan. 8, 1974

3,784,570
4-CHLOROPYRAZOLYL COMPOUNDS
Carl-Wolfgang Schellhammer, Opladen, Germany, assignor to Bayer Aktiengesellschaft, Leverkusen, Germany
No Drawing. Filed Aug. 18, 1970, Ser. No. 64,828
Claims priority, application Germany, Aug. 23, 1969,
P 19 42 926.6
Int. Cl. C07d 49/18, 55/04
U.S. Cl. 260—308 B                                4 Claims

ABSTRACT OF THE DISCLOSURE

Optical brighteners on the basis of 4-chloro-pyrazolyl-(1) compounds having the formula:

P—F—Q in which P stands for a radical which is linked to a carbon atom of the radical F and corresponds to the formula:

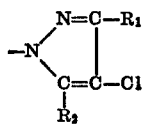

in which $R_1$ and $R_2$ represent hydrogen, an alkyl radical, a cycloalkyl, aralkyl or aryl radical; F represents the radical of a fluorescent system; Q represents hydrogen or a radical with the same meaning as P linked to a carbon atom of the radical F.

---

The subject-matter of the present invention comprises 4-chloropyrazolyl-(1) compounds of the general formula

P—F—Q        (I)

in which P stands for a radical which is linked to one carbon atom of the radical F and corresponds to the formula

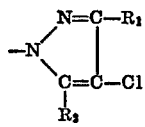

where $R_1$ and $R_2$ denote hydrogen, an alkyl radical with 1–17 carbon atoms, a cycloalkyl, aralkyl or aryl radical; F means the radical of a fluorescent system; and Q stands for hydrogen or a radical P linked to a carbon atom of the radical F, as well as their production and their use as optical brightening agents.

The radicals $R_1$ and $R_2$ may be identical or different and they may contain non-colouring substituents, for example, halogen atoms such as fluorine, chlorine or bromine; alkoxy groups with up to 4 carbon atoms; aryloxy groups; alkylmercapto groups; arylmercapto groups; alkyl-sulphone groups; aryl-sulphone groups; cyano groups; acylamino groups, especially alkyl- and phenyl-carbonylamino groups; carboxamide groups; carboxylic acid groups; carboxylic acid ester groups; sulphonic acid groups; sulphonic acid ester groups; or sulphonamide groups.

Suitable alkyl radicals are, for example, —$CH_3$, $C_2H_5$, —$C_3H_7$, —i—$C_3H_7$, —$C_4H_9(n)$, —i—$C_4H_9$, —t—$C_4H_9$, —$C_4H_9$(sek), —$C_{17}H_{35}$, —$CH_2Cl$, —$CH=CH_2$, —$CH_2$—$COOC_2H_5$, —$CH_2$—$CH_2$—$COOCH_3$.

Suitable cycloalkyl radicals are, for example, the cyclopentyl radical, the methyl-cyclopentyl radical or a cyclohexyl radical.

Suitable aralkyl radicals are, for example, the benzyl radical, the phenylethyl radical, the p-chlorobenzyl radical, the p - methoxybenzyl radical, the p-carboxybenzyl radical, the p-cyanobenzyl radical or a p-butyl-benzyl radical.

Suitable aryl radicals are, for example, phenyl or naphthyl radicals which may contain substituents, for example, halogen such as fluorine, chlorine or bromine; alkyl groups with up to 4 carbon atoms; alkoxy groups with up to 4 carbon atoms; cyano, alkylsulphonyl, arylsulphonyl, acylamino, carboxamide, carboxy, carboxylic acid ester, sulphonic acid or sulphonic acid ester groups.

Suitable fluorescent radicals F are primarily those with at least 4 conjugated —C=C or —C=N double bonds, for example, radicals of stilbene, styrene, 2-styryl-benzoxazole, naphthalimide, benzidine-sulphone, coumarin or carbostyril.

The radicals F as well as $R_1$ and $R_2$ may otherwise contain any substituents with the exception of coloring substituents. The following radicals F may be mentioned, in particular:

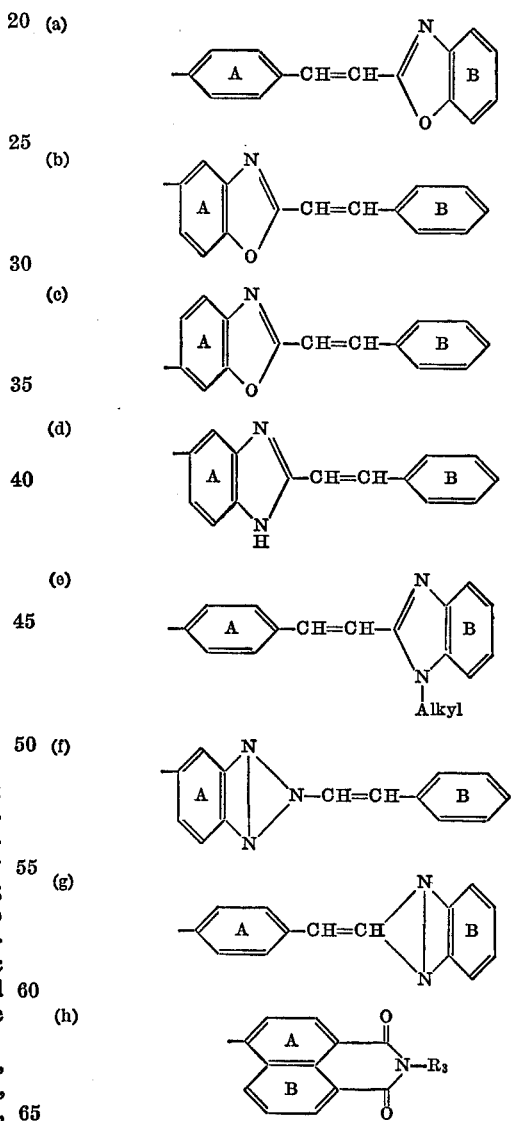

$R_3$=H, alkyl, aryl (optionally substituted)

(i)

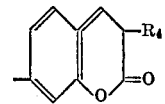

$R_4$=aromatic-carbocyclic or aromatic-heterocyclic radical (k) 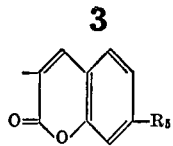

R₅=aromatic-heterocyclic radical (l) 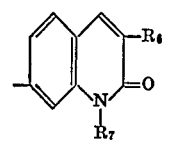

R₆=aromatic-carboxylic radical
R₇=alkyl, cycloalkyl, carboxamide, carboxylic acid ester (m) 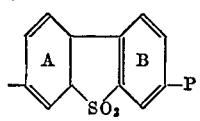

(n) 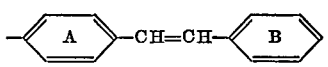

The benzene nuclei B as well as the radicals R may contain, for example, radicals P attached via a carbon atom.

The benzene nuclei or the heterocyclic rings in the radicals (a)–(n) may obviously contain further non-coloring substituents, for example, alkyl, aryl, alkoxy, sulphonic acid, cyano, halogen, sulphonamide, carboxamide, acylamino and carboxylic acid ester groups or further fused benzene rings.

Preferred radicals (a) are those in which the ring B is not further substituted or contains alkyl or phenyl radicals as substituents.

Preferred radicals (b) and (c) are those in which the ring B contains no substituents or contains a radical P.

Preferred radicals (g) are those in which the ring A is unsubstituted or carries a sulpho group, and the ring B is likewise unsubstituted or contains a phenyl radical or a fused benzene ring as substituent.

Preferred radicals (m) are those in which the rings A and B are unsubstituted or carry a sulphonic acid group as substituent.

Preferred radicals (h) are those in which R₃ stands for an alkyl group with 1–4 carbon atoms or an alkylcarbonyloxy-alkyl group and the rings A and B are not further substituted.

Preferred radicals (i) are those in which R₄ stands for a phenyl group which may be substituted by halogen, especially chlorine, or by alkyl or alkoxy groups with 1–4 carbon atoms, or stands for a heterocyclic radical attached via a nitrogen atom, for example, an optionally quaternised triazolyl-(1,2,4) radical.

Preferred radicals (k) are those in which R₅ stands for a heterocyclic radical, but preferably for a pyrazolyl-(1), triazolyl-(1,2,4), triazolyl-(1,2,3), benzotriazolyl-(2) or naphthotriazolyl-(2) radical which is attached via a nitrogen atom and may be further substituted. Suitable substituents for the aforesaid heterocyclic radicals are primarily halogen, such as chlorine, alkyl and alkoxy radicals with 1–4 carbon atoms and phenyl radicals. The phenyl, alkyl and alkoxy radicals may contain further substituents, for example, OH, halogen, alkoxy.

Preferred radicals (1) are those in which R₅ stands for an optionally substituted phenyl group and R₆ for a carboxylic acid alkyl ester group with 1–4 carbon atoms in the alkyl group, or for a carboxylic acid, mono- or dialkylamide group with 1–4 carbon atoms in the alkyl group.

Preferred radicals (n) are, for example, those of the formula

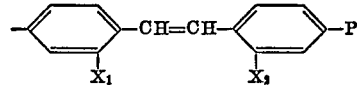

in which X₁ and X₂, independently of one another, stand for hydrogen, CN, SO₃H, COOH, a carboxamide or sulphonamide group, and P has the same meaning as above.

The preferred radicals within this series are those in which P stands for a radical

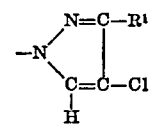

in which R₁' denotes hydrogen, an optionally substituted alkyl group with 1–4 carbon atoms or an optionally substituted phenyl group, especially a sulphophenyl group.

Other preferred radicals (n) are, for example, those of the formula

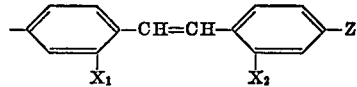

in which X₁ and X₂ have the same meaning as above, and Z stands for an optionally substituted radical

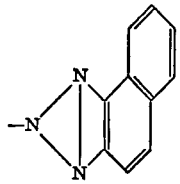

or a radical

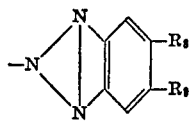

where R₈ stands for hydrogen or an alkyl group with 1–4 carbon atoms, and R₉ stands for hydrogen or an alkoxy group with 1–8 carbon atoms.

Preferred radicals P are, quite generally, those in which R₁ stands for an optionally substituted alkyl group with 1–4 carbon atoms or for an optionally substituted phenyl group, and R₂ represents hydrogen.

Preferred compounds from the stilbene series are assembled in the following table.

TABLE I

Compounds of the formula

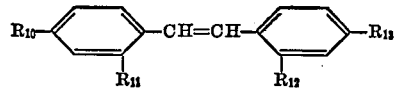

| | R₁₀ | R₁₁ | R₁₂ | R₁₃ |
|---|---|---|---|---|
| (a) | ![structure] | —H | —H | ![structure] |

TABLE I—Continued
| | $R_{10}$ | $R_{11}$ | $R_{12}$ | $R_{13}$ |
|---|---|---|---|---|
| (b) | ≡ | —CN | —CN | |
| (c) | ≡ | —SO$_3$H | —SO$_3$H | |
| (d) | ≡ | —SO$_3$H | —SO$_3$H | |
| (e) | ≡ | —SO$_3$H | —H | |
| (f) | ≡ | —SO$_3$H | —SO$_3$H | |
| (g) | ≡ | —SO$_3$H | —SO$_3$H | |
| (h) | ≡ | —SO$_2$NH$_2$ | —SO$_2$NH$_2$ | |
| (i) | ≡ | —SOOH | —SOOH | |
Suitable compounds of the styryl-benzazole series are for example, those stated in Table II:
TABLE II
(a)
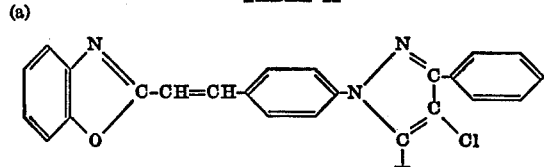
(b)
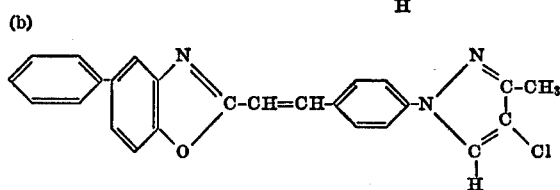
(c)
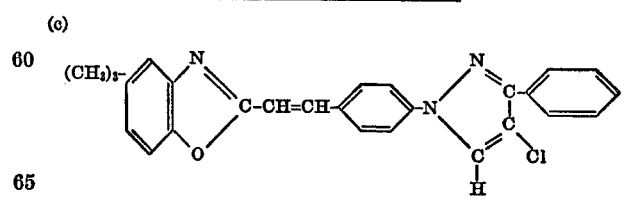
(d)
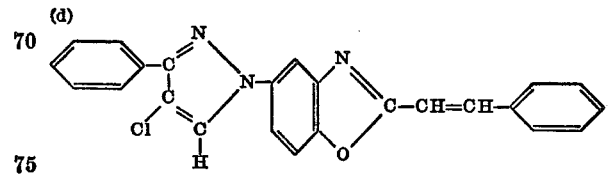

(e) [structure]

(f) [structure]

(g) [structure]

(h) [structure]

(i) [structure]

(j) [structure]

The following compounds from the benzidine-sulphone series are particularly advantageous:

[structure]

and

[structure]

Suitable compounds from the naphthalimide series are stated in the following Table III:

TABLE III

Compounds of the formula

[structure]

TABLE III

| No. | $R_{15}$ | $R_{14}$ |
|---|---|---|
| 1 | n-$C_4H_9$ | H |
| 2 | $C_2H_5$ | $CH_3$ |
| 3 | n-$C_3H_7$ | $CH_3$ |
| 4 | $CH_2CH_2OCOC_3H_7(n)$ | $CH_3$ |

Suitable compounds from the coumarin series are the following, for example:

TABLE IV

Compounds of the formula

[structure]

| No. | $R_{16}$ | $R_{17}$ |
|---|---|---|
| 1 | [Cl-pyrazolyl] | [phenyl] |
| 2 | Same as above | [p-tolyl] |
| 3 | do | [p-Cl-phenyl] |
| 4 | [phenyl-Cl-pyrazolyl] | [phenyl] |
| 5 | [pyrazolyl] | [Cl-pyrazolyl] |
| 6 | [CH$_3$-pyrazolyl] | Same as above. |
| 7 | [Cl-pyrazolyl] | Do. |
| 8 | [phenyl-pyrazolyl] | Do. |
| 9 | [phenyl-Cl-pyrazolyl] | Do. |

TABLE IV—Continued

| No. | R₁₆ | R₁₇ |
|---|---|---|
| 10 |  | |
| 11 | Same as above | Same as above. |
| 12 | | Do. |
| 13 | | Do. |
| 14 | | Do. |
| 15 | | Do. |
| 16 | | |
| 17 | Same as above | Same as above. |
| 18 | do | |
| 19 | | |
| 20 | Same as above | |
| 21 | | |
| 22 |  | Same as above. |

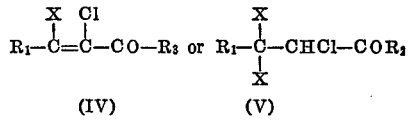
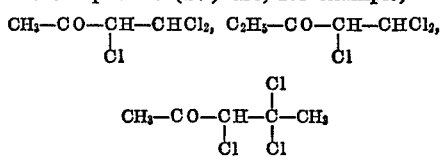
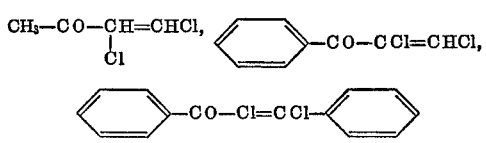
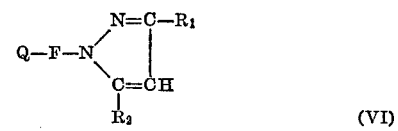

The new compounds (I) can be prepared in various ways:

(A) By the reaction of hydrazines of the formula $$H_2NHN-F-(NHNH_2)_n \quad (II)$$

in which F has the same meaning as above, and n stands for the numbers 0 or 1, with α-chloro-β-dicarbonyl compounds of the general formula $$R_1-COCHClCOR_2 \quad (III)$$

in which $R_1$ and $R_2$ have the same meaning as above.

Suitable hydrazines (II) are, for example, 4,4'-dihydrazino-stilbene,
4,4'-dihydrazino-2,2'-dicyanostilbene,
2-[4-hydrazino-styryl]-benzoxazole,
2-styryl-5-hydrazino-benzoxazole,
2-styryl-6-hydrazino-benzoxazole,
2-(4-hydrazinostyryl)-benzimidazole,
1-methyl-2-(4-hydrazinostyryl)-benzimidazole,
2-(4-hydrazino-styryl)-benzotriazole,
2-styryl-5-hydrazino-benzotriazole,
2,7-dihydrazino-benzidinosulphone,
2,7-dihydrazino-benzinidinosulphone-3,6-disulphonic acid,
7-hydrazino-3-phenyl-coumarin,
7-hydrazino-3-[1,2,4-triazolyl-(1)]-coumarin,
7-hydrazino-3-[4-chloropyrazolyl-(1)]-coumarin,
7-hydrazino-3-phenyl-1-methyl-carbostyril,
4-hydrazino-naphthalimide,
N-n-propyl-4-hydrazino-naphthalimide.

The hydrazines (II) are obtained by the reduction of corresponding diazonium salts with tin(II) chloride, sodium hydrogen sulphite or sodium dithionite at temperatures between 0° and 30° C.

The reaction is generally carried out at temperatures of about 20–150° C., preferably in a solvent such at N,N-dimethyl formamide, dimethyl sulphoxide, ethylene glycol, ethylene glycol monomethyl ether, ethylene glycol monomethyl ether acetate, diethylene glycol, water, 10% hydrochloric acid, acetic acid.

(B) By the reaction of hydrazines of the Formula II with compounds of the general formula $$R_1-\underset{X}{\overset{X}{C}}=\underset{}{\overset{Cl}{C}}-CO-R_2 \quad \text{or} \quad R_1-\underset{X}{\overset{X}{C}}-CHCl-COR_2$$

$$(IV) \qquad\qquad (V)$$

in which X stands for halogen, especially chlorine, —OH, —O-alkyl, —O-aryl, —SO₃H, —SO₂-alkyl, —SO₂-aryl, an optionally substituted amino group, or a quaternary ammonium radical.

Suitable compounds (IV) are, for example, $$CH_3-CO-\underset{Cl}{\overset{}{CH}}-CHCl_2, \quad C_2H_5-CO-\underset{Cl}{\overset{}{CH}}-CHCl_2,$$

$$CH_3-CO-\underset{Cl}{\overset{}{CH}}-\underset{Cl}{\overset{Cl}{C}}-CH_3$$

Suitable compounds (V) are, for example $$CH_3-CO-\underset{Cl}{\overset{}{CH}}=CHCl, \quad \text{Ph}-CO-CCl=CHCl,$$

$$\text{Ph}-CO-Cl=CCl-\text{Ph}$$

The reaction is generally carried out at temperatures between 20° C. and 160° C. in DMF, dimethyl sulphoxide, ethylene glycol, diethylene glycol, glycol monomethyl ether, glycol monomethyl ether acetate, water or acetic acid, possibly in the presence of an acid acceptor such as sodium acetate or potassium carbonate.

(C) By chlorination of compounds of the general formula $$Q-F-N\underset{\underset{R_2}{\overset{}{C}}=CH}{\overset{N=C-R_1}{\diagup}} \quad (VI)$$

in which F, Q, $R_1$ and $R_2$ have the same meaning as above.

Chlorination is carried out, for example, with chlorine or sulphonyl chloride in inert solvents such as carbon tetrachloride or hydrochloric acid, at temperatures of about 0–100° C.

Suitable compounds (VI) are, for example, those described in U.S. patent specification No. 3,362,958 and French patent specification No. 1,567,497.

(D) By the conversion of suitable intermediate products containing the radical P. Suitable intermediate products are, for example,

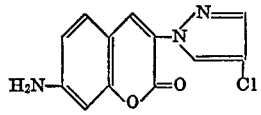

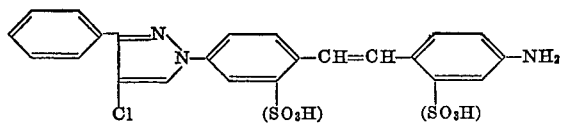

which are converted into the brightening agents, for example, by acylation or triazolization.

The new optical brightening agents of the formula (I) can be used for the optical brightening of a variety of high-molecular or low-molecular organic materials; the following materials may be mentioned by way of example:

Synthetic organic high-molecular materials, for example, polymerization products derived from organic compounds which contain at least one polymerizable carbon-carbon double bond and the conversion products, such as crosslinking, graft or decomposition products; diluted polymers etc., such as polymers derived from $\alpha,\beta$-unsaturated carboxylic acids and their derivatives; from olefine-hydrocarbons; polymers derived from vinyl and vinylidene compounds; from halogenated hydrocarbons; polymerization products obtainable by ring opening, such as polyamides of the polycaprolactam type; furthermore, formaldehyde polymers or polymers which can be obtained by polyaddition as well as polycondensation, such as polyethers, polythioethers, polyacetals, thioplasts; polycondensation products or precondensates derived from bi- or polyfunctional compounds containing groups capable of condensation, as well as their homo- and co-condensation products, such as e.g. saturated (e.g. polyethylene terephthalate) or unsaturated (e.g. maleic acid dialcohol polycondensates and their cross-linking products with copolymerizable vinyl monomers) products; polyesters, polyamides (e.g. hexamethylene-diamine adipate), maleinate resins, melamine resins, phenol resins (novolakes), aniline resins, furan resins, carbamide resins and also their precondensates and products of analogous structure, polycarbonates, silicone resins and others; polyaddition products, such as polyurethanes, epoxide resins; furthermore, semi-synthetic organic materials, such as cellulose esters or mixed esters (acetate, propionate), nitrocellulose, cellulose ether, regenerated cellulose or the after-treatment products thereof; synthetic materials of casein; furthermore, natural organic materials of animal or vegetable origin, for example, those based on cellulose or proteins, such as wool, cotton or silk.

The organic materials concerned may be present in various stages of processing and various aggregate conditions, for example, as blocks, plates, chips, granules, films, foils, lacquers, ribbons, coverings, impregnations and coatings, or as filaments, fibres, flocks. On the other hand, the aforesaid materials may also be present in the unformed state in various homogeneous and inhomogeneous forms of division and aggregate conditions, e.g. as powders, solutions, emulsions, dispersions.

Fibre materials may be present, for example, as endless filaments, staple fibres, flocks, strand goods, textile threads, yarns, fibre fleeces, or as textile fabrics or textile bonded materials, knitted fabrics, and also as papers, cardboards or paper pulps, etc.

The brightening of textile materials is preferably carried out in an aqueous medium from a solution or dispersion. Dispersing agents may be added, such as soaps, polyglycol ethers of fatty alcohols, fatty amines or alkylphenols, cellulose sulphite waste liquor or condensation products of optionally alkylated naphthalene-sulphonic acids with formaldehyde. The brightening can be performed from a neutral, weakly alkaline or acidic bath, optionally at elevated temperatures. The brightening agents can also be applied from solutions in organic solvents.

The new optical brightening agents may also be added to the materials or incorporated with them before or during moulding. For example, they may be added to the moulding materials or injection-moulding materials in the production of films, foils, ribbons or moulded parts, or they may be dissolved or dispersed in the spinning solution prior to spinning. The optical brightening agents may also be added to the starting compounds, reaction mixtures or intermediate products for the production of fully or semi-synthetic organic materials, that is to say also before or during the chemical reaction, for example, a polycondensation, polymerization or polyaddition.

The new brightening agents are characterized by a particularly good fastness to chlorite.

The amount of the new optical brightening agents to be used according to the invention referred to the material to be optically brightened, may vary within wide limits. In general, amounts between 0.01 and 0.2 percent by weight are applied.

The new brightening agents may also be used as follows, for example:

(a) In mixtures with dyestuffs or pigments or as additives to dyebaths, printing, discharge or reserve pastes, and also for the after-treatment of dyeings, prints or discharge prints.

(b) In mixtures with so-called "carriers," anti-oxidizing agents, ultraviolet rays-absorbing agents, thermal stabilizers, chemical bleaching agents, or as additives to bleaching baths.

(c) In mixtures with cross-linking agents, finishing agents, such as starch or finishing agents obtainable by synthetic methods. The products according to the invention can also be added with advantage to baths used for achieving a crease-proof finish.

(d) In combination with detergents. The detergents and brightening agents may be added separately to the wash baths to be used. It is also advantageous to use detergents to which the brightening agents have been admixed. Suitable washing agents are, for example, soaps, salts of sulphonate detergents, such as sulphonated benzimidazoles substituted on the 2-carbon atom by higher alkyl radicals, salts of monocarboxylic acid esters of 4-sulphophthalic acid with higher fatty alcohols, and also salts of fatty alcohol sulphonates, alkylaryl-sulphonic acids or condensation products of higher fatty acids with aliphatic hydroxy- or amino-sulphonic acids. Non-ionic washing agents may also be used, e.g. polyglycol ethers derived from ethylene oxide and higher fatty alcohols, alkyl-phenols or fatty amines.

(e) In combination with polymeric carrier materials (polymerization, polycondensation or polyaddition products), in which the brightening agents are incorporated in dissolved or dispersed form, possibly in adidtion to other substances, for example in the case of coating, impregnating or binding agents (solutions, dispersions, emulsions) for textiles, fleeces, paper, leather.

EXAMPLE 1

A cotton fabric is moderately moved about in a liquor ratio of 1:20 in a bath at 70–80% C. for 30 minutes. The bath contains, per liter, 0.06 g. of the brightening agent (c) of Table I and 2 g. sodium chlorite. The fabric is subsequently rinsed and dried. It is brightened with a blue tint, the brightening effects have good fastness to light.

The brightening agent used above was prepared as follows: 40 g. (0.1 mol) 4,4'-dihydrazino-stilbene-2,2'-disulphonic acid are dissolved neutral in 450 cc. of water with the addition of alkali. The solution is mixed with stirring with a solution of 44 g. α,β-dichloro-acrylophenone in 300 cc. ethylene glycol monomethyl ether, and the mixture is heated to reflux temperature in the course of 2 hours. It is then adjusted to pH 6 and boiled for 4 hours, the pH value being adjusted from time to time to pH 6 by the addition of a sodium carbonate solution. When the mixture is cooling down, a yellow material is precipitated, which is filtered off with suction and recrystallized from water/ethylene glycol monomethyl ether. The brightening agents (d), (f) and (g) of Table I can be used equally successfully for the brightening of cotton fabrics.

EXAMPLE 2

A fabric of poly-ε-caprolactam is moderately moved about for 30 minutes in a liquor ratio of 1:40 in a bath of 80–90° C. containing 0.2 g. of the brightening agent (h) of Table I per liter. After rinsing and drying, the fabric is excellently brightened. The brightening effects are stable to an alkaline sodium hypochlorite solution.

The brightening agent was obtained by converting the brightening agent 1(c) of Table I into the disulphochloride with the aid of phosphorus pentachloride and reacting the disulphochloride with ammonia.

EXAMPLE 3

White laundry goods of cotton or polyamide are washed in the presence of a commercial detergent in a liquor ratio of 1:20 at 60–90° C. with the addition of 0.1 g. of the brightening agent (e) of Table I or (j) of Table II. After rinsing and drying, the laundry goods are excellently brightened. The brightening effects are not reduced by the addition of a sodium hypochlorite solution to the wash bath.

The brightening agent (e) of Table I is prepared in analogy with the brightening agent (c) of Table I, starting from 4,4'-dihydrazino-stilbene-2-sulphonic acid and α,β-dichloro-acrylophenone.

The brightening agent (j) of Table II is obtained from 4-hydrazino-2-sulpho-styryl-2-benzothiazole and α,β-dichloro-acrylophenone in water/glycol monomethyl ether in the presence of sodium acetate.

EXAMPLE 4

1 kg. of soap flakes is mixed with 1 g. of the brightening agent (d) of Table I and the mixture is worked up into soap tablets. In daylight the soap has an excellent white appearance.

The brightening agent (d) of Table I is prepared by sulphonating the brightening agent (c) of Table I with concentrated sulphuric acid at 100–120° C.

EXAMPLE 5

Polyacrylonitrile fibres are introduced in a liquor ratio of 1:40 into an aqueous bath containing, per liter, 1 g. oxalic acid, 1 g. sodium chlorite and 0.1 g. of the brightening agent 20 of Table IV. The bath is heated to boiling temperature within 20 minutes and kept at the same temperature for 45–60 minutes. The polyacrylonitrile fibres are subsequently rinsed and dried. The fibres are then excellently brightened.

The brightening agent used above was prepared in the following way:

59 g. 7 - [3 - methyl - pyrazolyl-(1)]-3-[1,2,4-triazolyl-(1)]-coumarin were dissolved in 500 cc. of concentrated HCl. A solution of 7.5 g. sodium chlorate in 75 cc. of water was added thereto dropwise at 30° C. After 30 minutes, the content of the flask was turned out on to 1 kg. of ice, the resultant solution was almost neutralized with a 45% sodium hydroxide solution. The precipitated material was filtered off with suction, washed with water, dried and recrystallized from 1,2-dichlorobenzene. There are thus obtained 45 g. 7-[3-methyl-4-chloro-pyrazolyl-(1)]-3-[1,2,4-triazolyl-(1)]-coumarin of M.P. 281–283° C. in the form of small pale yellow crystals (brightening agent (19) of Table IV).

A solution of 25 g. of the brightening agent (19) of Table IV in 1 liter of boiling 1,2-dichlorobenzene is mixed with 10 g. dimethyl sulphate. The crystalline 7-[3-methyl-4 - chloro - pyrazolyl - (1)] - 3 - [4 - methyl - 1,2,4 - triazolyl-(1)-ium]-coumarin methosulphate (brightening agent 20 of Table IV) melting at 237–240° C. is precipitated after a short time.

EXAMPLE 6

A fabric of polyester fibres produced from terephthalic acid and glycol is treated in a liquor ratio of 1:40 in a bath containing, per liter, 1 g. oleyl alcohol sulphonate, 0.75 g. formic acid and 0.06 g. of the brightening agent 2 of Table III or 0.05 g. of the brightening agent 6 of Table IV. The bath is subsequently heated to boiling temperature and kept at the same temperature for 30–60 minutes. After rinsing and drying, the polyester fibres exhibit an outstanding brightening effect.

The brightening agent 2 of Table III was obtained in the following way:

31 g. N - ethyl - 4 - [3-methyl-pyrazolyl-(1)]-naphthalimide were dissolved in 500 cc. of highly concentrated hydrochloric acid. A solution of 4 g. sodium chlorate in 30 cc. of water were added at 30° C., the content of the flask was turned out on to 2 kg. of ice after 1 hour, the precipitated material was filtered off with suction and washed with water until neutral. The N-ethyl-4-[3-methyl-4-chloro-pyrazolyl-(1)]-naphthalimide (brightening agent 2 of Table III) was recrystallized from n-butanol after drying; it melts at 192–194° C.

The brightening agent 6 of Table IV was synthetized in the following way:

1.14 kg. pyrazolyl-(1)-acetic acid were stirred with 6 litres of concentrated hydrochloric acid. A solution of 324 g. sodium chlorate in 1.35 kg. of water is added dropwise at 30° C. below the surface, and stirring is continued for 30 minutes. The mixture is diluted with ice to a volume of 18 litres and the precipitated material is filtered off with suction. After washing the filter cake until neutral and drying at 120° C., 1.068 kg. 4-chloropyrazolyl-(1)-acetic acid of M.P. 160° C. are obtained.

2.04 kg. acetic acid anhydride, 1.016 kg. 4-acetylaminosalicylidene-aniline, 0.41 kg. of anhydrous sodium acetate and 0.803 kg. 4-chloro-pyrazolyl-(1)-acetic acid are heated at 145° C. for 15 hours. The temperature of the melt is then allowed to drop to 90° C. 4 kg. of ice are added, and the 7-acetylamino-3-[4-chloropyrazolyl - (1)] - coumarin which is precipitated after cooling to 20° C. is filtered off with suction. The filter cake is washed with 4 kg. acetone. After drying, 0.847 kg. 7-acetylamino-3-[4-chloropyrazolyl-(1)]-coumarin are obtained in the form of brownish small crystals of M.P. 288–290° C.

92 g. 7 - acetylamino-3-[4-chloro-pyrazolyl-(1)]-coumarin are stirred in 180 cc. of 78% sulphuric acid at 100° C. for 1 hour. The mixture is then cooled to 20° C., mixed with 600 cc. of glacial acetic acid and diazotized at +16° C. with a solution of 21 g. sodium nitrite in 100 cc. of water. After 3 hours, the diazonium salt solution is cooled to 0° C., and a solution of 136 g. tin(II) chloride in 300 cc. of concentrated hydrochloric acid is added. The precipitated yellow material is filtered off with suction after one hour, suspended in 2 litres of water, the suspension is rendered ammoniacal. After filtering off with suction, washing with water and drying, 93 g. 7-hydrazino-3-[4-chloro-pyrazolyl-(1)]-coumarin of M.P. 209° C. (decomp.) are obtained.

14 g. 7-hydrazino - 3 - [4-chloropyrazolyl)-(1)]-coumarin are heated in 100 cc. methyl glycol with 8 g. 3-keto-butyraldehyde dimethyl-acetal under reflux for 4 hours while stirring. The mixture is then treated with 5 cc. of concentrated hydrochloric acid and boiled for a further 2 hours. The material precipitated after cooling is filtered off with suction, washed with methanol and recrystallized from glycol monomethyl ether acetate/active charcoal. In this way there are obtained 7-[3-methyl-pyrazolyl - (1)]-3-[4-chloro-pyrazolyl - (1)] - coumarin (brightening agent 6 of Table IV) of M.P. 241–244° C.

EXAMPLE 7

A fabric of polyester fibres is padded in an aqueous solution containing, per litre, 1 g. of the brightening agent 12 of Table IV, 2 g. of a commercial dispersing agent and 1 g. of a commercial wetting agent. The fabric is then squeezed to a weight increase of 100%, then dried and heated at 190° C. for 20 seconds. Compared with untreated fabric, the fabric thus treated exhibits a strong brightening effect of very good fastness to chlorite and light.

The brightening agent used above was prepared in the following way:

30.5 g. 7 - acetylamino-3-[4-chloro-pyrazolyl-(1)]-coumarin (the preparation of this compound is described in Example 6) were stirred in 60 cc. of 78% sulphuric acid at 100° C. for 1 hour. The solution is diluted at 100° C. with 200 cc. of glacial acetic acid and diazotized at 16° C. with a solution of 7 g. sodium nitrite in 30 cc. of water. After 1 hour, the diazonium salt solution is admixed with a solution of 15 g. 2-amino-naphthalene in 200 cc. of glacial acetic acid. While cooling with ice, the mixture is adjusted to pH 3 by means of a concentrated sodium hydroxide solution and stirred for 3 hours. The precipitated red o-amino-azo dyestuff is then filtered off with suction, washed with water and dried.

38.5 g. of this dyestuff are dissolved in 600 cc. of hot pyridine and mixed at 90° C. with 40 g. copper(II) acetate. When the red color of the dyestuff has disappeared, the content of the flask is turned out on to a mixture of 400 g. of ice and 700 cc. of concentrated hydrochloric acid, the precipitated material is filtered off with suction and dried after washing with water. After recrystallization from 1,2,4 - trichlorobenzene or dimethyl sulphoxide, there is obtained 7-[naphtho[1,2:d]-triazolyl - (2)] - 3-[4-chloro-pyrazolyl-(1)]-coumarin (brightening agent 12 of Table IV) of M.P. 266–268° C.

EXAMPLE 8

6 kg. terephthalic acid dimethyl ester and 5 litres ethylene glycol are mixed in a stirrer autoclave of 20 litres capacity with 0.05% zinc acetate and 0.01% 7-[5-β-hydroxyethoxy-6-methyl-benzotriazolyl-(2)]-3 - [4 - chloro-pyrazolyl-(1)]-coumarin (brightening agent 15 of Table IV). The autoclave is heated to 180° C. while stirring, transesterification taking place at about 150° C. with the elimination of methanol. The eliminated methanol is distilled off via a reflux condenser. The temperature is raised to 200° C. after one hour and to 220° C. after a further 45 minutes. After 2¾ hours in all the transesterification is completed. The amount of eliminated methanol is at least 2.4 litres. For preliminary condensation, the product is then transferred by means of nitrogen pressure into another autoclave of 20 litres capacity which has been preheated to 275° C. During the preliminary condensation, the excess of glycol is passed directly via a cooler and collected. After 45 minutes, a vacuum is applied, which is initially weak and is increased to below 1 mm. Hg in the course of a further 45 minutes. The stirring speed is reduced from 60 r.p.m. to 40 r.p.m. The polycondensation is completed 2½ hours after a pressure of 1 mm. Hg has been reached. The product is passed through a spinning unit and chopped. An excellently brightened material of outstanding fastness to light is obtained.

The brightening agent used above was prepared in the following way: 30.5 g. 7-acetylamino-3-[4-chloropyrazolyl-(1)]-coumarin were hydrolyzed and diazotized as described in Example 7. The diazonium salt was coupled at pH 3 with 18 g. 2-β-hydroxyethoxy-4-amino-toluene. The dried red o-amino-azo dyestuff was triazolized at 90° C. in pyridine with 40 g. copper(II) acetate. After recrystallization of the crude product from 1,1,2,2-tetrachloroethane, there are obtained 39 g. of the brightening agent 15 of Table IV of M.P. 277–278° C.

EXAMPLE 9

Polypropylene fibres which have a yellowish appearance are immersed in a liquor ratio of 1:40 in an aqueous bath containing, per litre, 0.075 g. of the brightening agent (i) of Table II and 0.5 g. of a commercial alkylnaphthalene sulphonate. The bath is then heated to 90–95° C. within 10 minutes and kept at the same temperature for 30 minutes. After drying, the polypropylene fibres have a pure white appearance. The brightening effect has good fastness to light and chlorite.

The brightening agent had been obtained by reacting 2-(4-hydrazino-styryl) - benzotriazole with α,β-dichloroacrylophenone in methyl glycol in the presence of sodium acetate.

EXAMPLE 10

1 g. of the brightening agent 3 of Table III is incorporated on rolls in 100 g. of opaque soft polyvinyl chloride. The material is excellently brightened and has a neutral white shade.

The brightening agent 3 of Table III is obtained by chlorinating N-propyl-4-[3-methyl-pyrazolyl-(1)] - naphthalimide in analogy with the method described for the preparation of the brightening agent 2 of Table III.

EXAMPLE 11

0.6 g. of the brightening agent 4 of Table III are dissolved in 1000 g. of a colorless cellulose ester varnish. The varnish is thinly spread on a colorless substrate. Excellent reddish brightening effects are obtained after drying.

The brightening agent 4 of Table III is obtained by chlorination of N-α-hydroxyethyl-4-[3-methyl-pyrazolyl-(1)]-naphthalimide, carried out in analogy with the preparation of the brightening agent 2 of Table III, and esterification of the hydroxy group of the resultant N-β-hydroxyethyl-4-[3-methyl-4-chloro-pyrazolyl - (1)] - naphthalimide, for example, with butyric acid anhydride.

We claim:
1. 3-[4 - chloro-pyrazolyl - (1)] - coumarines of the formula

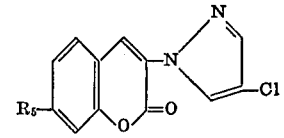

in which $R_5$ stands for an aromatic-heterocyclic radical selected from the group consisting of pyrazolyl-(1), benzotriazolyl-(2), or naphthotriazolyl-(2), which is attached via a nitrogen atom and may be further substituted with substituents selected from the group consisting of halogen; alkyl with 1–4 carbon atoms; alkoxy with 1–4 carbon atoms; alkoxy with 1–4 carbon atoms substituted by hydroxy, and phenyl.

2. 4-chloro-pyrazolyl-(1) compounds of the formula

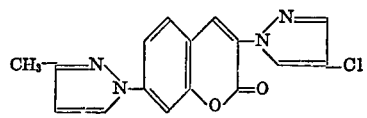

3. 4-chloro-pyrazolyl-(1) compounds of the formula

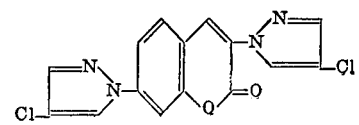

4. 4-chloro-pyrazolyl-(1) compounds of the formula
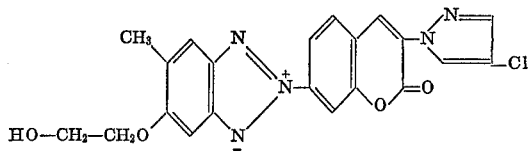
References Cited
UNITED STATES PATENTS
3,449,333  6/1969  Dorlars et al. ____ 260—240 CA
FOREIGN PATENTS
1,463,324  11/1966  France _____ 260—240 CA
1,567,497  4/1969   France _____ 260—308 R
JOHN D. RANDOLPH, Primary Examiner
U.S. Cl. X.R.
106—137, 148, 176; 117—33.5 T; 162—157 R, 162; 252—117, 301.2 W, 543; 260—37 R, 67 R, 67.6 R, 75 N, 78 SC, 88.7 R, 92.8 A, 93.7, 240 C, 240 CA, 240 D, 240.9, 281, 308 A, 310 R, 823